United States Patent [19]
Dummermuth

[11] Patent Number: 6,009,454
[45] Date of Patent: *Dec. 28, 1999

[54] MULTI-TASKING OPERATION SYSTEM FOR INDUSTRIAL CONTROLLER

[75] Inventor: Ernst Dummermuth, Chesterland, Ohio

[73] Assignee: Allen-Bradley Company, LLC, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/999,854

[22] Filed: Nov. 10, 1997

Related U.S. Application Data

[63] Continuation of application No. 08/315,538, Sep. 30, 1994, abandoned.

[51] Int. Cl.⁶ .................................. G06F 9/00; G06F 9/46
[52] U.S. Cl. ............................ 709/108; 709/107; 710/7; 712/231; 712/241
[58] Field of Search .................................... 395/775, 650, 395/700, 827, 840–841, 375, 701–710, 670, 672, 677, 564, 568, 588, 595, 597–598, 909–906, 914, 915; 709/107–108; 712/234–236, 241, 226, 227, 229, 231

[56] References Cited

U.S. PATENT DOCUMENTS

| | | | |
|---|---|---|---|
| 4,442,504 | 4/1984 | Dummermuth et al. | 710/129 |
| 4,510,565 | 4/1985 | Dummermuth et al. | 710/129 |
| 4,837,688 | 6/1989 | Cronauer et al. | 395/673 |
| 4,847,751 | 7/1989 | Nakada et al. | 395/500 |
| 4,901,232 | 2/1990 | Harrington et al. | 395/826 |
| 5,050,070 | 9/1991 | Chastain et al. | 395/375 |
| 5,068,778 | 11/1991 | Kosem et al. | 364/138 |
| 5,109,511 | 4/1992 | Nitta et al. | 713/1 |
| 5,301,198 | 4/1994 | Kawasaki | 395/375 |
| 5,317,757 | 5/1994 | Medicke et al. | 395/800 |
| 5,357,358 | 10/1994 | Cohen | 395/375 |
| 5,386,569 | 1/1995 | Harada et al. | 395/700 |
| 5,418,919 | 5/1995 | Kadosawa et al. | 395/375 |
| 5,452,461 | 9/1995 | Umekita et al. | 395/700 |
| 5,485,620 | 1/1996 | Sadre et al. | 395/700 |
| 5,504,930 | 4/1996 | Kobayashi et al. | 395/800 |
| 5,511,207 | 4/1996 | Ohde et al. | 395/800 |
| 5,619,409 | 4/1997 | Schultz et al. | 709/107 |

*Primary Examiner*—Ayaz R. Sheikh
*Assistant Examiner*—Raymond N Phan
*Attorney, Agent, or Firm*—Keith M. Baxter; John M. Miller; John J. Horn

[57] ABSTRACT

A multi-tasking operating system for real-time control of industrial processes integrates ladder type programs and state-type programs by viewing each as a series of instructions with an implicit pointer list pointing to the next instruction. A fixed number of instructions of each program task are executed after which the effective pointer to the next instruction is stored toward the next time that task is invoked. Multiple tasks that need to be coordinated can be linked with subtasks that can be guaranteed complete execution by allocating sufficient instructions to those subtasks.

7 Claims, 5 Drawing Sheets

MULTI-TASKING OPERATION SYSTEM FOR INDUSTRIAL CONTROLLER

This is a continuation of Ser. No. 08/315,538 filed on Sep. 30, 1994, now abandoned.

FIELD OF THE INVENTION

The present invention relates to industrial controllers for the "real-time" control of industrial processes, and in particular, to an operating system for an industrial controller that allows multiple tasks to be executed with apparent simultaneity.

BACKGROUND OF THE INVENTION

Industrial controllers are special purpose computers used for controlling industrial processes and manufacturing equipment.

Under the direction of a stored program, the industrial controller examines a series of inputs, reflecting the status of the controlled process, and changes outputs effecting control of the industrial process. The inputs and outputs are most simply binary, that is, ON or OFF, however, analog inputs and outputs, assuming a continuous range of values, are also used.

Industrial controllers are frequently programmed in a "relay ladder" language where instructions are represented graphically by "contacts" and "coils" of virtual relays connected and arranged in ladder-like rungs. This relay ladder language with its input contacts and output coils reflects the emphasis in industrial control on the collection and transmission of large numbers of inputs and outputs. The relay ladder language also reflects the fact that most industrial control is "real-time". That is, an ideal industrial controller behaves as if it were composed of multiple relays connected in parallel ladder rungs to produce outputs in essentially instantaneous response to changing inputs.

While relay ladder language type programming is well suited to the handling of large amounts of input and output data and the logical relationship governing such data, it is not well adapted to programming control systems that are logically viewed as moving between discrete "states" in response to historical input and output data. The multiple states of such systems are more easily visualized in state-diagram type languages in which the program is not represented as a simultaneous execution of parallel rungs of relays but instead as a series of interlinked states with execution of the program being the passing from one state to another. For the purpose of this application, conventional computer languages in which the language describes an execution thread of a processor (such as FORTRAN or C) as well as sequential function charts and state diagram-type programs will also be considered state-type languages.

These different programming languages, ladder- and state-type, differ primarily in the way they present the programming tasks to the human programmer, that is prior to actual execution, each programming language is normally compiled to a common set of machine instructions for execution on a conventional Von Neumann-type computer.

Thus, the parallel relay-like structure of a ladder diagram is, in fact, executed sequentially one step at a time and the appearance of parallel operation is obtained by employing extremely fast processors in the execution of the sequential control program. Similarly, the appearance of residing at a given state in a state-type program is obtained by repeated execution of tests and loops by the computer for each given state.

This ability to implement a wide variety of different languages on a single processor platform allows the programmer to select between state-type and ladder-type programming languages, at will, in confronting a particular industrial control problem. Depending on the type of language selected, a different compiler will be used to produce machine executable code.

Often, a single industrial control task will have portions best suited to different types of languages. For example, a programmer might wish to program the part of the control task that collects and disseminates data in a ladder-type language, but wish to program the remainder of the control task in using a state-type language which better reflects the fundamental logic of the control process.

In addition, for large control programs, it would be desirable to write the programs in separate modules or tasks that could be independently run and checked. For example, if the I/O handling were undertaken by a ladder-type program separate from a state-type control program, the ladder program might be separately debugged to evaluate its data handling and generation of Boolean combinations of the inputs and outputs.

Generally, however, integrating different program types in a single application is a difficult task. For example, integrating a ladder-type and state-type language in a single program is complicated by the fact that the ladder language contemplates essentially continuous execution (simulating parallel execution) whereas a state-type program is frequently in one state for an indefinite period of time. Switching between programs on a time basis can detrimentally affect the assumption of simultaneous execution of the ladder rungs, causing adjacent rungs to be executed at significantly different times. If one simply embeds the ladder program as one state in the state-type program, it is difficult to guarantee that the ladder will be executed on a regular basis. Yet forcing the state-type program to periodically go to a particular state (for the execution of the ladder type program) undermines the intent that the state-type program logically represent the states of the actual control process.

SUMMARY OF THE INVENTION

The present invention permits large industrial control programs to be broken into smaller tasks, each of which may be represented by a different program type, by providing a multi-tasking operating system uniquely suited for the industrial controller environment.

The invention provides multi-tasking by recognizing that both ladder-type and state-type programs can be considered simply collections of individual instructions linked together by an implicit pointer list. Thus, at the conclusion of any instruction, a pointer may be developed to a single next instruction. After the execution of any instruction for a given task, this pointer to the next instruction of that task may be saved so that the program may move to another task. The saved pointer is used to resume the first task at some later time without interruption.

Importantly, the invention's ability to decompose a general industrial control program into a set of instructions linked by pointers permits sharing the processor between tasks—not on the basis of time but on the basis of a number of instructions. This can be critical to the efficient operation of an industrial control system where it is desirable that certain tasks be executed in blocks having a predetermined number of instructions.

As an additional feature, the present invention permits linking effectively independent tasks through one or more subtasks. These linking tasks facilitate operating the larger tasks separately, for debugging, yet permit coordination of the tasks during normal operation.

Specifically then, the present invention provides a method of multi-tasking a plurality of separate task programs in an industrial controller having a processor, each task program having instructions executed in an instruction sequence. The instructions of a given task program are executed in the instruction sequence from a start instruction until the completion of the execution of a predetermined number of instructions. The next instruction in the instruction sequence is stored in a current pointer list, the current pointer list identifying the next instruction to the given task program. A next instruction for a next task program is then read from the current pointer list and a predetermined number of instructions for this next task are executed, at which time the next instruction in the instruction sequence for that task is stored in the current pointer list associated with that task. This process is repeated for each of the tasks.

It is thus one object of the invention to provide a multi-tasking system suitable for industrial control in that it permits the precise allocation of processor resources according to how many instructions are to be executed in each task as opposed to how much time each task is allotted. The task programs may be ladder-type programs or state-type programs.

It is an analogous object of the invention to permit precise tailoring of the number of instructions executed in each task to the type of program being executed. In particular, it is desirable to have every rung of a ladder program executed each time the task is invoked to insure that the data collected by each rung of the ladder program is contemporaneous with that collected by the other rungs. Conversely, only one or two instructions may be desirably executed in a state-type control program in which states are changed relatively infrequently.

In one embodiment, switching between tasks is provided by embedded transition instructions that pass control to the processor at predetermined points in each task.

It is therefore another object of the invention to provide the multi-tasking system of the present invention using conventional processing hardware. Most processing hardware does not provide an internal count of the number of instructions that it has executed that may be used to trigger a task switching operation.

In the situation where multiple task programs must be synchronized in real-time, at least one task program may include a semaphore instruction that sets a semaphore variable indicating execution of the semaphore instruction. At least one other task of the task program may include a loop instruction that reads a loop variable to prevent further execution of the task program until the loop variable is set. A linking task may be written which provides for reading of the semaphore variable and setting of the looping variable as a function of the semaphore variable. Each task, including this linking task, may then be executed as before. The multi-tasking operating system may allocate sufficient instructions to the linking task to ensure that the entire linking task is executed prior to task switching and thus to insure proper synchronization of the tasks.

Accordingly, it is another object of the invention to permit smaller "glue" tasks to be used to link larger tasks that must run in a real-time industrial control environment. The glue tasks permit independent testing of the multiple tasks as connected to actual equipment. The particular multi-tasking environment insures that the glue tasks are completely executed prior to transition to a new task.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Industrial Controller Hardware

Figure 1:
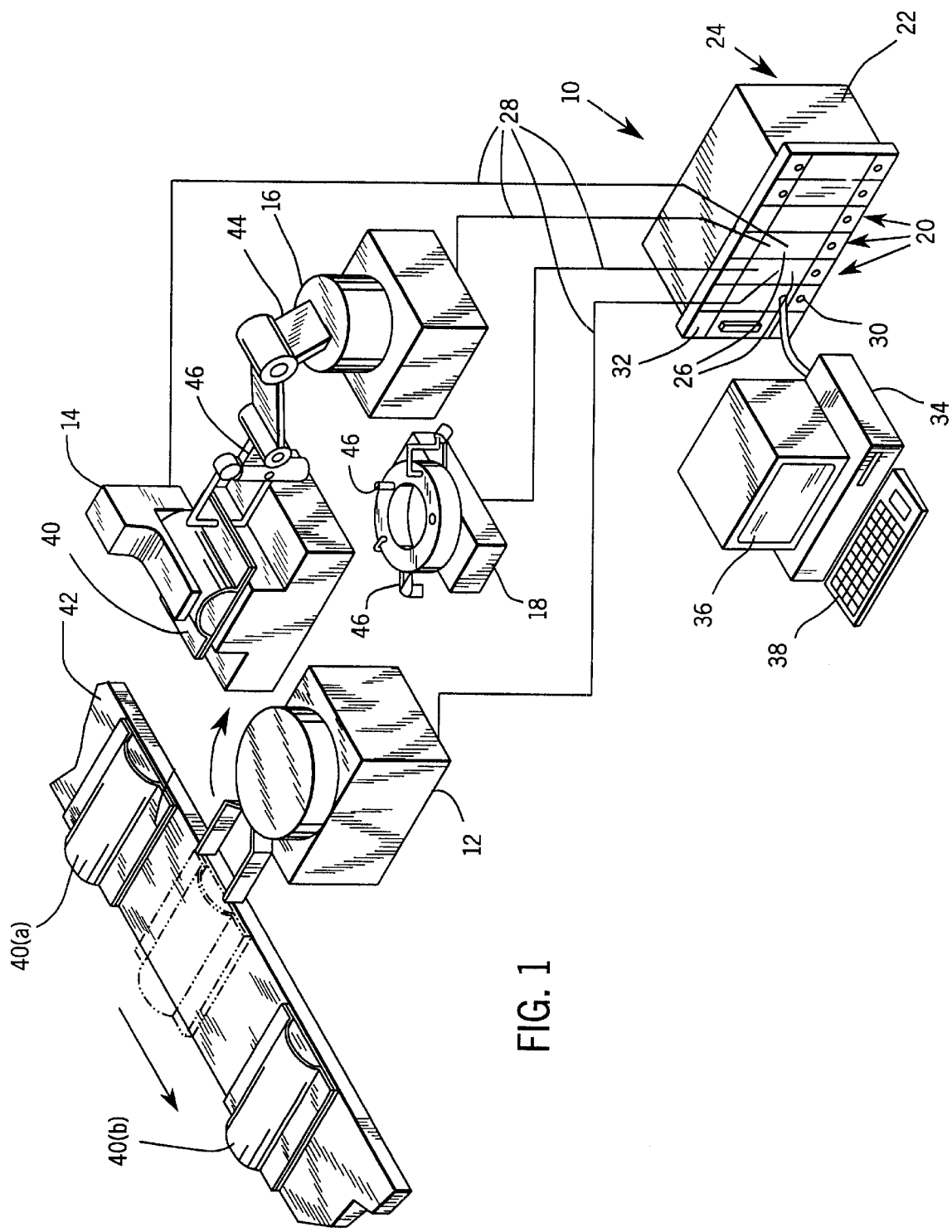
FIG. 1 is a simplified perspective view of an industrial process employing a shuttle, a press, a welder and a tool changer, each of which may be controlled by a separate task executed on a single industrial controller.

Referring to FIG. 1, the present invention may be used on an industrial controller 10 controlling and coordinating the operation of an industrial process executed on a shuttle 12, a press 14, a welder 16 and a tool changer 18.

As is understood in the art, the industrial controller 10 provides a number of functional modules 20 collected in a rack 22 and communicating with each other via a backplane 24. Typically, the industrial controller 10 includes a power supply module 32 providing power to the other modules, and input/output (I/O) modules 26, providing output electrical signals to and receiving input electrical signals from the controlled equipment 12–18 by means of cables 28 extending from the I/O modules 26 to the various pieces of equipment.

A processor module 30 communicates, via the backplane 24, with the input and output modules 26 to process information provided by the I/O modules 26 according to a stored program and to provide output information to the I/O modules 26 in response to that stored program and the input data received from the I/O modules 26. The processor module 30 may include a port communicating with a stand alone terminal 34, the latter being a general purpose computer workstation including a screen 36 and keyboard 38 such as are well known in the art.

Typically, a control program will be entered to the processor module 30 by a programmer on the terminal 34. The control program will be written in a higher level programming language and then compiled into machine code held within the memory of the processor module 30. During operation, the processor of the processor module 30 executes the compiled machine code to control the attached equipment 12–18.

In the example equipment of FIG. 1, the control program must coordinate the equipment 12–18 for the welding of a part 40. In particular, unwelded parts 40a are loosely assembled and pass along a conveyor belt 42 until they are aligned with shuttle 12. Shuttle 12 removes the parts 40a from the conveyor belt 42 and places them within the press 14 which holds the parts 40 for welding by the welder 16. As depicted, the welder 16 includes an arm 44 holding a welding tool 46. The welding tool 46 may be replaced by a tool changer 18 which includes various other welding tools 46 on a carousel. During the welding by the welder 16, one or more welding tools 46 may be employed.

The press 14 may rotate the parts 40a to aid in the welding operation. At the conclusion of the welding operation, the press 14 releases the welded part 40b and it is received by the shuttle 12 and returned to the conveyor 42.

Control Task Programs

Figure 2:
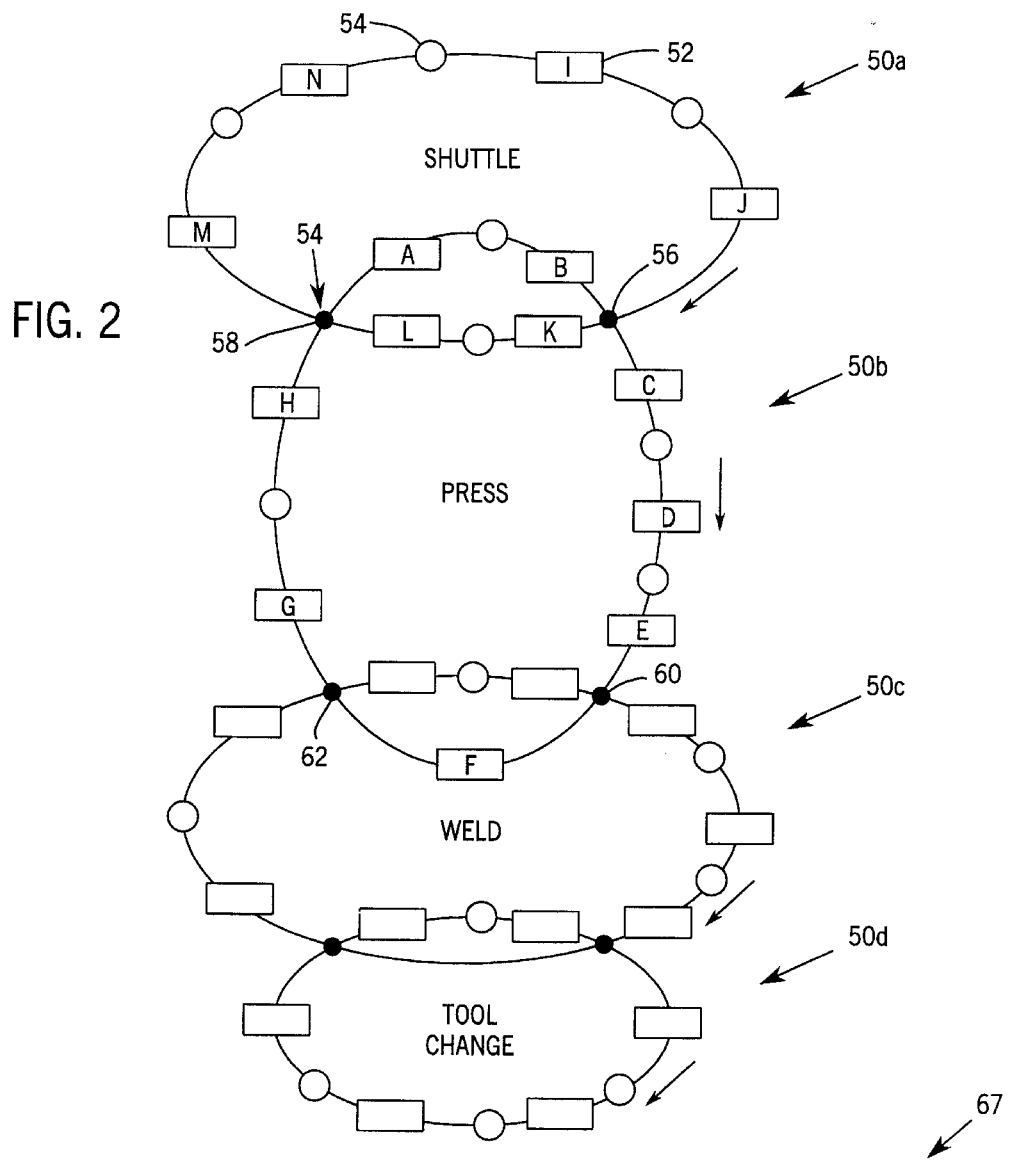
FIG. 2 is a state representation of the different tasks of the industrial process of FIG. 1 overlapping to show their interaction mandated by the physical operation of the control of equipment.

Referring now also to FIG. 2, the control of each of the separate equipment of the shuttle 12, press 14, welder 16 and tool changer 18 may be undertaken by separate tasks 50a–50d represented as multiple states linked together in ellipses, each ellipse indicating the cyclic nature of each task. The states of each task 50a–50d are composed of "actions" 52 represented as rectangles, and "tests" 54 represented as circles.

The representation of the tasks 50a–50d as actions 52, tests 54 and transitions between actions and tests is intrinsically a state-type representation. However, it must be recognized that these tasks could in fact be implemented as ladder-type programs.

The particular actions 52 of the shuttle task 50a include each of the steps of the control of the shuttle 12 necessary to remove a part 40a from the conveyor belt 42 and to place it into the press 14 and afterwards to reverse these steps removing the part 40b from the press 14 and replacing it on the conveyor 42. For example, the tasks may govern the control of the shuttle grasping mechanism, the rotation of the shuttle head and various necessary delays accommodating the physical limitations of the shuttle 12.

The ellipses of the tasks 50a–50d are overlapping at some tests 54 to indicate the interaction between the tasks 50a–50d. These common tests 54 between the tasks 50a–50d are closed or filled-in and serve as semaphores reflecting physical linking of the process control. For example, the shuttle 12 may only unload the press 14 when the press 14 has opened as indicated by semaphore 56. After a new part 40a is loaded, the press 14 cannot start moving until the shuttle 12 is out of the way as indicated by semaphore 58. Likewise, the tasks 50b and 50c of the press 14 and welder 16 are linked. The welder 16 cannot begin welding until the part 40a is clamped by the press 14 indicated by semaphore 60 and the press 14 cannot release until the welding is complete at semaphore 62. Similarly the welding and tool changer tasks 50c and 50d are linked. The tool changing can only occur when the welder 16 is not operating on the parts 40. Note, however, that the tasks 50d and 50b of the tool changer 18 and press 14 are unrelated except through the intervening weld task 50c.

Figure 3:
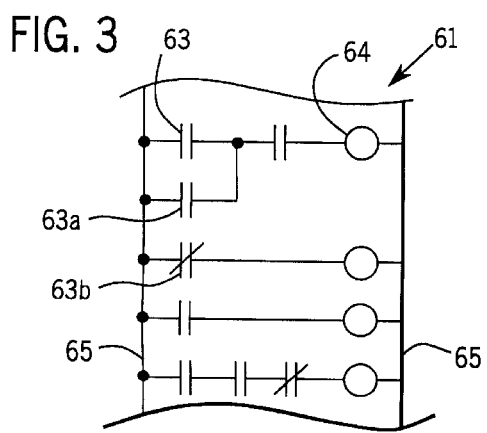
FIG. 3 is a schematic representation of a ladder-type program such as may be used in providing the tasks of FIG. 2.
Figure 4:
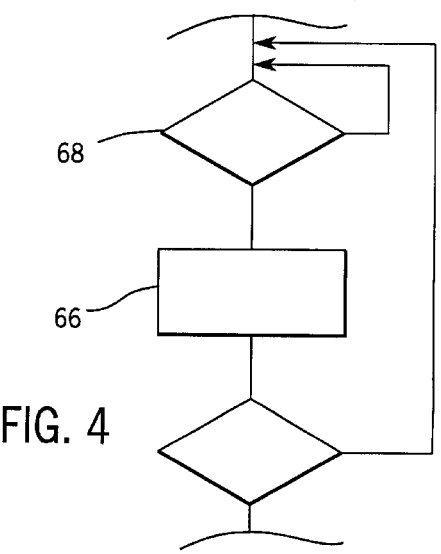
FIG. 4 is a schematic representation of a state-type program which may be used in implementing the tasks of FIG. 2.

Referring now to FIGS. 3 and 4, and as mentioned above, the tasks 50a–50d may be written in different higher level programming languages, each presenting a different module to the programmer. As previously described, and as shown in FIG. 3, one programming language produces a ladder-type program 61 employing the metaphor of contacts 63 wired in series and in parallel with an output coil 64 between parallel power rails 65. Here, output coils 64 can control contacts in the same or other rungs. The contacts 63 may be "normally opened" (63a) or "normally closed" (63b) thus providing all the elements for a Boolean logical system. Although the rungs appear to be executed in parallel as would occur if the electricity were in fact passing between the power rails 65 through the contacts 63 and coils 64, they are in fact executed rapidly in sequence as instructions on the processor of the processor module 30. Nevertheless, the apparent parallel operation of the rungs is best realized if the rungs are executed or "scanned" without interruption from top to bottom so that each rung is executed once in each scan and at a time contemporaneous with the other rungs.

In contrast, a state-type program 67 (shown in FIG. 4) is comprised of action blocks 66 and test blocks 68 linked together to show the execution flow of the program. An action block 66, when entered, executes particular actions and then exits to the next instruction group whereas a test block 68 performs a test and then branches or jumps to one of two different instructions depending on the results of that test. Generally, it cannot be guaranteed that a given action block 66 or test block 68 will be executed on a regular basis as the execution flow of the program continually changes according to the results of the test blocks 68.

Test block 68 represents a program "state" showing a branch back to its entry point. Here the program essentially waits for some test condition to be realized and loops until that test condition is true. In a system where such states change relatively slowly—because of physical characteristics of the linked processes which they are controlling—it may be desirable that a multi-tasking system allocate only a few instructions at a time to such programs to avoid wasting processor resources in continuous looping.

An important aspect of the present invention is the recognition that these two broad classifications of languages for industrial control: ladder-type and state-type, can each be reduced to an elemental instruction group followed by a jump to a next instruction group. In the ladder program of FIG. 3, each rung is an instruction group that branches to a next rung instruction group directly below according to an implicit pointer from one rung to the next and from the bottom rung to the top rung. In the state program of FIG. 4, the instructions may be test blocks where the jumps are explicit or action blocks where the jumps are implicitly to the next instruction group of the program.

Multi-Tasking Operating System

Figure 5:
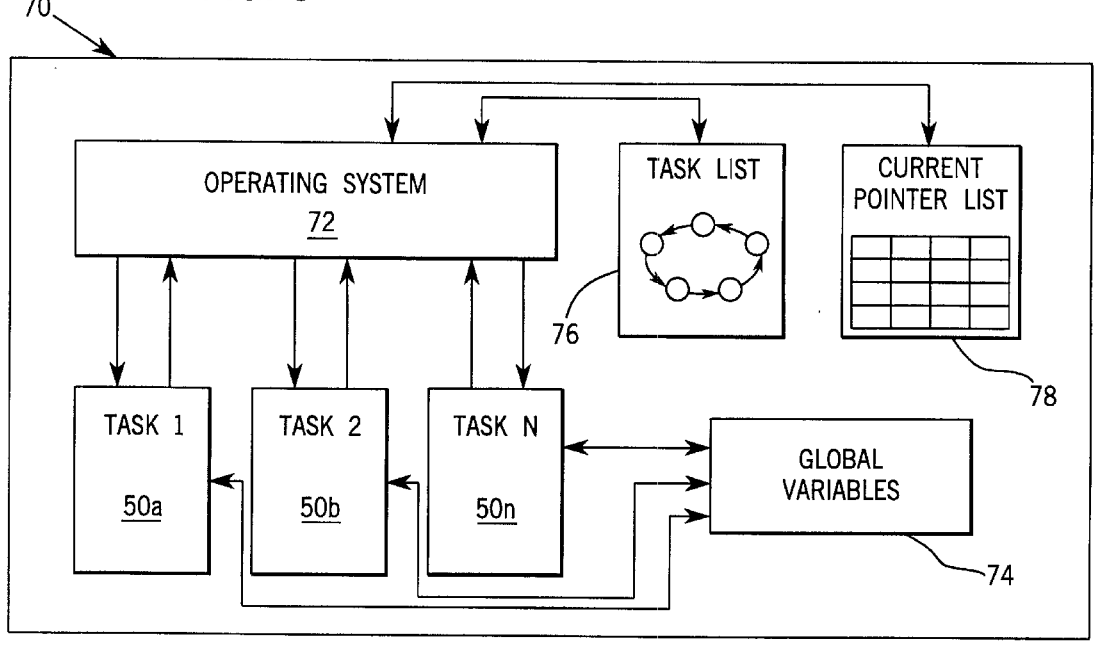
FIG. 5 is a schematic diagram of the operating system of the present invention which executes multiple tasks according to a task list and a current pointer list.

Referring now to FIG. 5, each task 50a–50d and other tasks may be entered through terminal 34 and compiled for storage in the memory 70 of the processor module 30. Each of the tasks 50a–50c employs global variables 74, also stored in memory 70 which record input and output values and intermediate variables related to that task.

Also contained in the memory 70 is an operating system program 72 that controls the execution of the tasks 50a–50d.

The operating system program 72 accesses two data structures in memory 70, the first being a task list 76, indicating each of the tasks 50a–50d that must be executed together with the sequence of their execution, and the second being a current pointer list 78, which provides information as to the current state of execution of the various tasks 50a–50d. Both the task list 76 and the current pointer list 78 will be discussed in further detail below.

Generally, the operating system program 72 executes each of the tasks 50a through 50d in the sequence indicated by the task list 76, periodically stopping each task and recording its progress in the current pointer list 78 and activating the next task. The recorded progress of the task is used to restart the task without disruption after the other tasks have all been executed for a given number of instructions.

The information in the current pointer list 78 is indexed by task so that when any task is started, its execution information can be rapidly found. Because each of the tasks 50a–50d employs global variables 74 (rather than local variables), the switching of tasks does not require the saving of local variables unique to each task but using a shared space in memory 70.

The operating system program 72 switches between tasks after a predetermined number of instructions by making the execution of each instruction explicit. Although this tracking of the number of executed instructions could be done through specialized hardware that reads the instruction counter of the processor of the processor module 30 and interrupts the execution of the current task after a predetermined number of instructions are executed, in a preferred embodiment, such tracking of instructions is allocated during compilation of the programs to include specialized "Software Interrupt" instructions within the program of each task.

Figure 6:
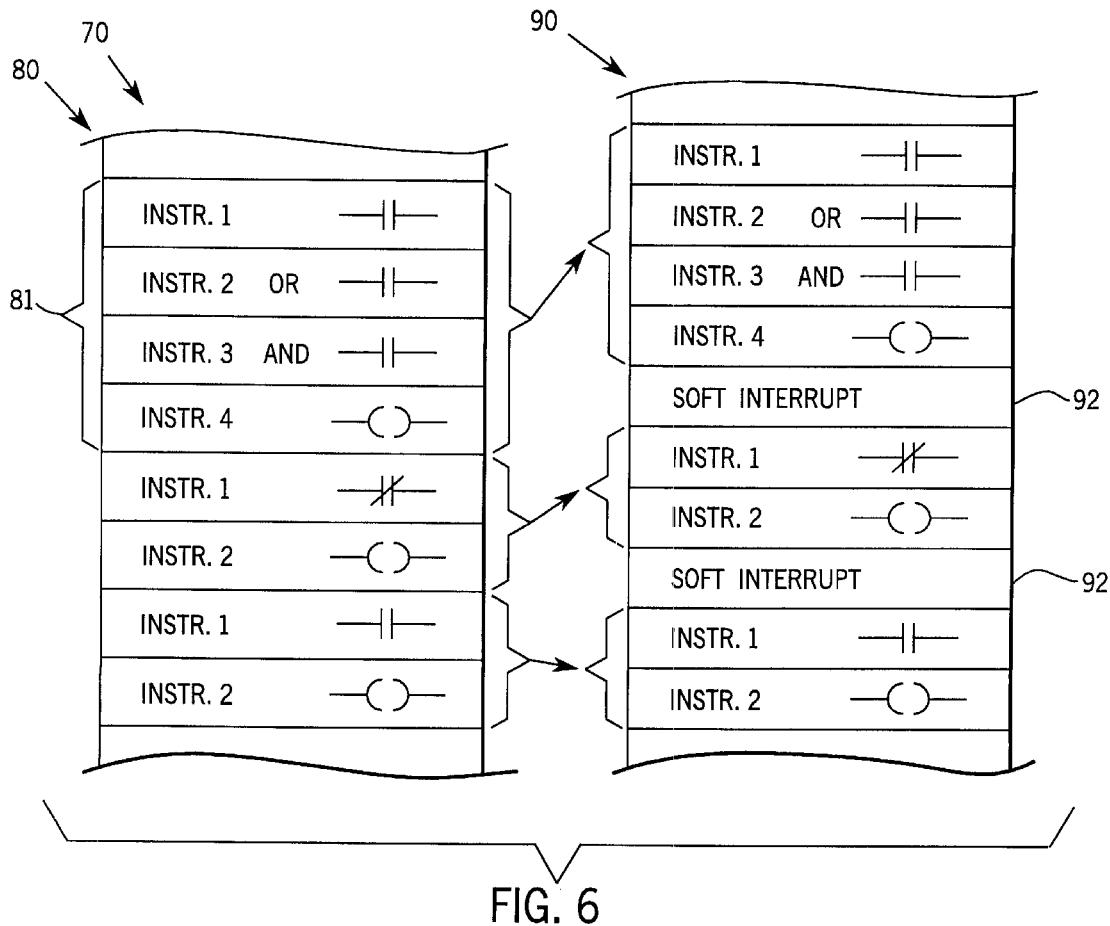
FIG. 6 is an example of the post compilation of a task written in a ladder programming language to include transition instructions that permit instruction-number based task switching for the operating system of FIG. 5.

Referring to FIGS. 3 and 6, the ladder type program 61 of FIG. 3 may be compiled and stored in memory 70 of the industrial controller as a set of instructions forming a program 80 of FIG. 6. A post compiler may now modify the program 80 to insert a software interrupt instruction 92 after each predetermined number of instructions making up an instruction group 81. The instruction group 81 may be a single rung, a group of rungs, or the entire ladder program.

In practice, each instruction group 81 is selected to compile to one or more machine language instructions which provide a complete logical operation, i.e. after the complete logical operation of the values of the internal registers of the processor are no longer needed may be cleared without effecting the program. Thus, if the program is interrupted after an instruction group 81, there is no need to save internal registers but all relevant memory has been saved as global variables.

Referring also to FIG. 5, when the software interrupt instruction 92 is executed, the value of the instruction counter of the processor, which has advanced by one, is entered into the pointer list 78 and the present task or program 80 is suspended. The operating system 72 advances to the next task in the task list 78, gets the current pointer of that task from the current pointer list 78 and loads that into the instruction counter to begin execution. Again as soon as a software interrupt instruction 92 is encountered, the operating system 72 moves to the next task as described.

Figure 7:
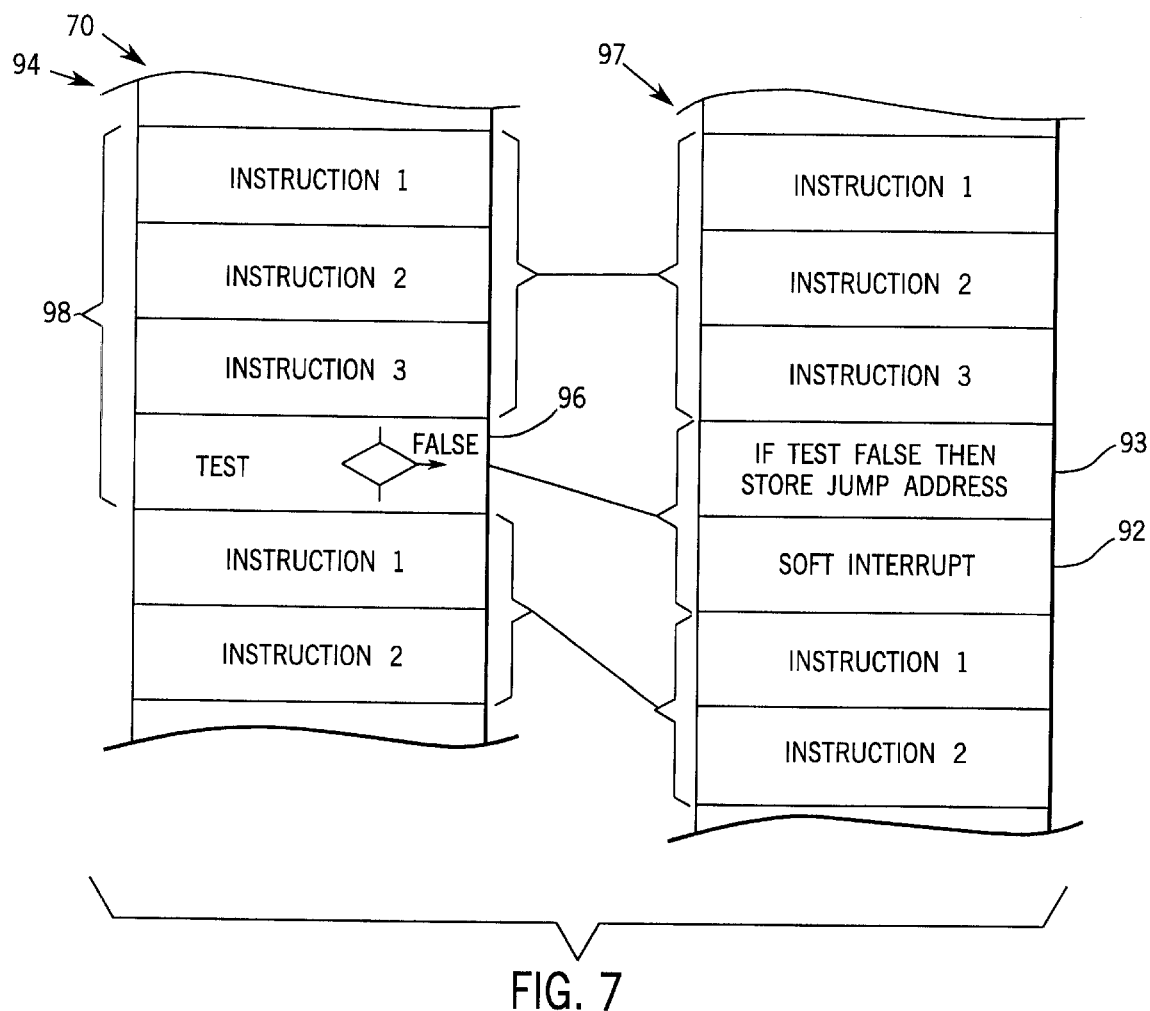
FIG. 7 is a figure similar to FIG. 6 showing an example of the post compilation of a program written in a state-type language.

Referring now to FIGS. 4 and 7, a state-type program 67 also compiles to a set of instructions 94 held in memory 70. Importantly, these instructions include test instructions 96 which test for certain conditions and jump within the program depending on that condition. Thus, unlike the compilation of the ladder logic program, instructions in the compiled program 94 are not necessarily executed according to their sequence in memory 70.

Again, the post compiler modifies the program 94 and inserts soft interrupts 92 after predetermined numbers of instructions within groups 98 and at the occurrence at any test instruction 96. For instructions that are not test instructions, the software interrupt is simply inserted into the post compiled program 97. For a test instruction, two instructions are inserted, the first instruction 93 performing the test of the instruction 96 and if the test if false (indicating a jump will occur) storing the jump address at a predetermined location in global memory. Instruction 93 is then followed by a soft interrupt instruction 92 as before.

Figures 8, 9:
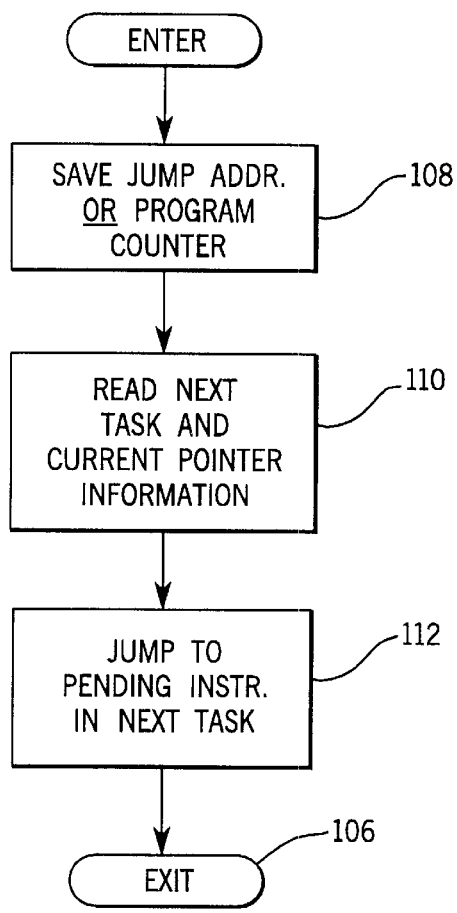
FIG. 8 is a detailed diagram of the current pointer list of FIG. 5 used for the instruction number task switching of the present invention.
FIG. 9 is a flow chart showing the principle steps of the operating system of the present invention.

Referring now to FIG. 9, each software interrupt instruction 92 causes the program to begin executing an operating system routine which handles switching from task to task as indicated by process block 100. At the first step of this routine indicated by process block 108, the operating system program 72 retrieves the jump address stored by the previously described instruction 93, or, if no jump address has been stored as indicated by a value of zero, the operating system retrieves the instruction counter from the stack and saves it in the current pointer list 78 under the current task. Thus the current pointer points to the next instruction to be executed by that task. The operating system 72 next proceeds to process block 110 where the task list 76 is consulted and the next task to be executed is determined. This task is used as an index to the current pointer list 78 to obtain the pointer address for the next instruction of that task. The address for that task are then placed in the instruction counter so that the execution of the new task may continue as if the task had been uninterrupted.

The operating system program 72 then proceeds to process block 112 and a software interrupt return is executed, returning the control of the processor to the address indicated by the current pointer in the current pointer list 78 so that the next task may resume operation.

Alternatively, the speed of the operating system can be improved if the task list 76 and current pointer list 78 are combined and the current pointers are stored directly in the task list 76 eliminating two indirect steps of access, one during storage and one during retrieval.

The ability to select the number of instructions executed in each task before the next task is switched to, allows precise allocation of processor resources to particular tasks, keeping with the strict demands for processor efficiency imposed by an industrial control system which operates in the real-time.

Generally, only one "Soft interrupt may be entered at the end of the program for ladder-type programs is selected so that an entire scan of all the rungs may be accomplished prior to the task switching thus insuring that each rung is operating on data that has been contemporaneously acquired with the other rungs.

Referring again to FIG. 2, in a cyclic control system where the tasks repeat regularly and are physically interlinked, the interrupt for the different tasks may be advantageously selected to approximate the relative number of instructions in each of different tasks. In this way, processor time is not unduly allocated to the chore of waiting for another task to be completed as required by the various semaphores.

Task Linking

The ability to execute separate tasks in an apparently simultaneous fashion and to precisely control the number of instructions executed in each task so that a given task may be ensured complete execution prior to task switching permits tasks to be linked advantageously simply by writing additional linking tasks whose sole purpose is to coordinate two other tasks. For example with respect to FIG. 2, semaphore 58 indicates that the shuttle 12 cannot undertake the transition between task M and task L, where the latter task L is the unloading of the press 14, before the press 14 has reached action A which is the opening of the press 14. Here the state program of the shuttle 12 must include a test 54 of whether the press is in action state A prior to permitting the transition from M to L.

This coordination may be accomplished by means of a pair of global variables: i.e. a "semaphore" variable set by the press 14 when it reaches task A and a "looping" variable read by the shuttle 12 prior to permitting a transition from state M to L. Preferably, however, the relationship between the semaphore variable and the looping variable may be advantageously accomplished by yet another task (not shown) which reads the semaphore variable and sets the looping variable. Preferably, this task also includes the reading of a "delinking" variable which may be set by the operator through the terminal 34. When the delinking variable is set, the looping variable rather than following the semaphore variable, is jammed on permitting operation of the shuttle 12 independent of operation of the press 14 for debugging purposes.

This simple linking task may be written in a ladder diagram form, as is superior for simple Boolean relationships, and can be programmed with only one "Software Interrupt" at the end to insure that it is completely executed prior to the other tasks running. Thus, unexpected states which might occur with partial execution of the linking tasks in between executions of the tasks which it links are avoided.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A method of providing multi-tasking of a plurality of separate task programs in an industrial controller having a processor, the task programs having instructions executed in an instruction sequence comprising the steps of:

(a) executing the instruction of a given task program in the instruction sequence from a start instruction until a completion of execution of a pre-determined number of instructions;

(b) storing in a current pointer list an indication of a next instruction in the instruction sequence of the given task program after the completion of execution of the pre-determined number of instructions, the current pointer list identifying the next instruction to the given task program;

(c) determining a next instruction for a next task program from the current pointer list;

(d) repeating steps (a)–(c) with the next task program as the given task program and the next instruction as the start instruction;

(e) repeating step (d) for each of the plurality of task programs wherein the next instruction for the next task program at step (d) is identical to the next instruction stored at step (b) for the given task program after a previous execution of the given task program at step (a); and (f) repeating step (e);

wherein the plurality of separate task programs includes at least one ladder task program being ridden in a ladder-type language in which each instruction is scanned sequentially in a fixed sequence wherein the predetermined number of instructions to be executed depends on the task;

wherein the predetermined number of instructions for the ladder task is selected to substantially complete the execution of each instruction of the ladder task once.

2. A method of providing multi-tasking execution of a plurality of separate task programs in an industrial controller, the industrial controller having a processor, the task programs having instructions executed in an instruction sequence, the method comprising the steps of:

(a) identifying a fixed number of instructions in each task to be executed without interruption;

(b) beginning executing instructions of a given task program at a first instruction indicated by a pointer in a pointer list and continuing in an instruction sequence;

(c) preventing switching to a next task program until the execution of the fixed number of instructions after the first instruction of the given task program substantially independently of the time of execution of the fixed number of instructions of the given task program, the fixed number being predetermined for the given task program;

(d) executing the instructions of the next task program;

(e) repeating steps (c) and (d) with the next task program as the given task program for each of the task programs; and (f) repeating step (e).

3. The method of claim 2 including the steps of:

storing in a current pointer list, associated with each task program, an indication of the last instruction executed; and using the current pointer list to determine a starting point for execution in the next task program upon the switching of step (b).

4. The method of claim 2 wherein the fixed number of instructions is marked by a transition instruction in the given task program.

5. The method of claim 2 wherein at least one of the task programs is written in a state-type language where the instructions are executed in different orders depending on an outcome of executed instructions.

6. The method of claim 2 wherein at least one of the task programs is written in a ladder-type language where the instructions are executed in a fixed sequence.

7. The method of claim 2 wherein at least one task program includes a semaphore instruction that sets a semaphore variable indicating the execution of the semaphore instruction and at least one other task program includes a loop instruction that reads a loop variable to prevent further execution of the other task program until the loop variable is set, the method including the further step of:

generating at least one linking task reading the semaphore variable and setting the looping variable as a function of the semaphore variable.

* * * * *